United States Patent Office 3,391,215
Patented July 2, 1968

3,391,215
PREPARATION OF ISOPRENE
Charles N. Winnick, Teaneck, N.J., assignor to Halcon International, Inc., a corporation of Delaware
No Drawing. Continuation-in-part of applications Ser. No. 543,802, Apr. 20, 1966, and Ser. No. 638,659, May 15, 1967. This application Aug. 10, 1967, Ser. No. 659,581
9 Claims. (Cl. 260—681)

ABSTRACT OF THE DISCLOSURE

Isoprene which is free of methylbutene is produced by subjecting the effluent from a methylbutene acetoxylation reaction to a thermal treatment at temperatures above about 100° C. and below about +300° C. before pyrolysis of the acetoxylated methylbutene.

RELATED APPLICATION

This application is a continuation-in-part of copending patent applications, Ser. No. 543,802, filed April 20, 1966, and Ser. No. 638,659, filed May 15, 1967.

BACKGROUND OF THE INVENTION

Acetoxylation of methylbutenes to form allylic acetates and cracking of the latter is an interesting route for the production of isoprene. A disadvantage of this procedure, however, is that the isoprene is contaminated with methylbutenes even though the reactor effluent is treated to remove unreacted methylbutenes before the allylic acetates are cracked. Separation of isoprene from these methylbutenes is difficult due to the similar boiling points of these materials. For example, isoprene has a boiling point of about 34.1° C. while 2-methylbutene-2 boils at about 38.4° C.

OBJECTS OF THE INVENTION

It is an object of the present invention to provide an improved process for preparing isoprene by the pyrolysis of allylic acetates.

Another object is to provide a process in which isoprene is not contaminated with methylbutenes. These and other objects of the present invention will be apparent from the following description.

SUMMARY OF THE INVENTION

The acetoxylation of methyl-butenes produces a mixture of allylic acetates and t-amyl acetate. The allylic acetates comprise 3-methyl-3 butene-2-ol-acetate, 3-methyl-2-butene-1-ol-acetate, 2-methyl-2-butene-1 - ol-acetate. Cracking or pyrolysis of the allylic acetates yields isoprene. Cracking of the t-amyl acetate, however, forms methylbutene. Hence, even though unreacted methylbutenes are removed from the methylbutene acetoxylation reactor effluent, a methylbutene precursor, t-amyl acetate, remains in the effluent. The t-amyl acetate is cracked along with the allylic acetates thus forming methylbutene, which is difficult to separate from isoprene. The removal of t-amyl acetate from the allylic acetates formed in the methylbutene acetoxylation reaction before converting the allylic acetates to isoprene provides isoprene which is not contaminated with methylbutenes. It has further been found that a-amyl acetate may be cracked much more readily than allylic acetates. In fact, t-amyl acetate my be cracked preferentially to methylbutene and acetic acid with no significant cracking of allylic acetates. As a result a particularly attractive process for producing isoprene free of contaminating methylbutene comprises subjecting the effluent from a methylbutene acetoxylation reaction to a pyrolysis treatment whereby t-amyl acetate is preferentially cracked.

DETAILED DESCRIPTION

The starting material for the production of isoprene according to the present invention is a methylbutene, such as, for example, 2-methylbutene-1, 2-methylbutene-2 or 3-methylbutene-1 or mixtures thereof. The methylbutene is acetoxylated by treatment with acetic acid in the presence of oxygen. The reaction may be facilitated by the presence of a catalyst. The acetoxylation reaction may be carried out using stoichiometric amounts of acetic acid and methylbutene, or using less than or more than stoichiometric quantities of either ingredient. Preferably, however, the acetic acid is present in excess. The acetoxylation reaction takes place at room temperature or above, preferably at elevated temperatures of from about 60° C. to about 180° C. The reaction is conveniently carried out at atmospheric pressure although pressures below or above atmospheric may be employed.

The acetoxylation reactor effluent is then treated to remove methylbutene precursors. This removal is accomplished by means of a thermal treatment at temperatures below those at which significant decomposition of the allylic acetates occurs, i.e., below about 300° C. This treatment may take place before or after removal of unreacted methylbutene from the reactor effluent. Preferably, it takes place before as then the unreacted methylbutene and the methylbutene formed from cracking the t-amyl acetate are removed in the same step.

After removal of methylbutene, the reactor effluent is subjected to a pyrolysis treatment whereby the allylic acetates are cracked to isoprene and acetic acid. The selective cracking of t-amyl acetate is increased by acidic catalysts such as, for example, sulfuric acid, p-toluene sulfonic acid, phosphoric acid, hydrogen chloride, silica alumina, cationic exchange resins, etc.

The following examples illustrate the present invention without, however, limiting the same thereto.

Example 1

A catalyst is prepared by dissolving 16 g. of mercuric acetate and 10 g. of copper acetate in a mixture containing 150 ml. of $H_2O$ and 5 ml. of acetic acid. The acetic solution is coated on to 400 cc. of 6–14 mesh activated coconut carbon. When the carbon is dried, a solution of 14 g. ferrous sulfate heptahydrate in 150 ml. of $H_2O$ is coated thereon. Acetoxylation of 2-methylbutene-2 is performed by feeding a 50/50 (weight) mixture of acetic acid and 2-methylbutene-2 at a rate of 60 ml. per minute and 9 liters per hour of oxygen over the catalyst at temperatures between 116° C. and 127° C. at atmospheric pressure. After 48 hours of operation the effluent contains about 3.0% of isoprene precursors and 0.3% of t-amyl acetate. The effluent is divided into free equal portions.

A first portion is distilled through a 15 tray Oldershaw column at atmospheric pressure to remove unreacted olefin and acetic acid. The bottoms are concentrated to 20 wt. percent allylic esters (isoprene precursors) and then analyzed. The bottoms contain less than 0.1% t-amyl acetate. Only traces of t-amyl acetate are found in the overhead showing that t-amyl acetate is decomposed.

A second portion of the effluent is distilled at atmospheric pressure to remove olefin at a pot temperature increasing up to 115° C. The bottoms are then divided into two parts and to one part are added 200 p.p.m. of p-toluene sulfonic acid. Both parts are refluxed for one hour. After this time, the t-amyl acetate concentration in both parts has decreased but the sample containing p-toluene sulfonic acid contains significantly less t-amyl acetate.

A third portion of the effluent is distilled at atmospheric pressure to remove unreacted olefin. The bottoms are then vaporized through a ¼ inch tube at a liquid hourly space velocity of 0.5 at a temperature of 250° C. Substantially all of the t-amyl acetate is decomposed while less than 2% of the allylic esters are decomposed.

After 2 recycles pyrolysis of the bottoms at a liquid hourly space velocity of 0.3 at 450° C. gives a yield of isoprene of about 85%, based on total allylic esters, in each case. The isoprene contains less than 0.2% methylbutene.

What is claimed is:

1. An improved process for preparing isoprene which comprises removing unreacted methylbutene and a methylbutene precursor from allylic esters formed by the acetoxylation of methylbutene before subjecting the reactor effluent to pyrolysis.

2. The process of claim 1 wherein methylbutene precursor comprise t-amyl acetate.

3. A process according to claim 2 wherein the t-amyl acetate is removed by heating the reactor effluent to a temperature above about 100° C.

4. A method according to claim 3 wherein the reactor effluent is heated to temperatures above about 100° C. and below about 300° C.

5. In a process for preparing isoprene which comprises acetoxylating a methylbutene to form allylic acetates and a methylbutene precursor and subjecting the allylic acetates to pyrolysis, the improvement comprising removing unreacted methylbutene and methylbutene precursor from the allylic acetates.

6. A process according to claim 5 wherein the methylbutene is acetoxylated at temperatures of from about 60° C. to about 180° C.

7. A process according to claim 5 wherein the methylbutene precursor is t-amyl acetate.

8. A process according to claim 5 wherein the methylbutene precursor is removed by heating the allylic acetates to a temperature above about 100° C.

9. A process according to claim 6 wherein the methylbutene precursor is removed by heating the allylic acetates to a temperature above about 100° C. and below about 300° C.

References Cited

UNITED STATES PATENTS

| | | | |
|---|---|---|---|
| 2,967,897 | 1/1961 | Sharp et al. | 260—681 |
| 3,085,121 | 4/1963 | Guest et al. | 260—666 |
| 3,270,082 | 8/1966 | Lumbroso et al. | 260—681 |

DELBERT E. GANTZ, *Primary Examiner.*

G. E. SCHMITKONS, *Assistant Examiner.*